United States Patent
Yoon et al.

(10) Patent No.: US 10,615,420 B2
(45) Date of Patent: Apr. 7, 2020

(54) ELECTRODE SLURRY OF SOLID OXIDE FUEL CELL, GREEN SHEET FOR ELECTRODE OF SOLID OXIDE FUEL CELL, ELECTRODE OF SOLID OXIDE FUEL CELL, AND METHOD FOR MANUFACTURING SOLID OXIDE FUEL CELL AND ELECTRODE OF SOLID OXIDE FUEL CELL

(71) Applicant: LG CHEM, LTD., Seoul (KR)

(72) Inventors: Kiyoul Yoon, Daejeon (KR); Hyosook Joo, Daejeon (KR); Kwangwook Choi, Daejeon (KR); Hyeon Choi, Daejeon (KR); Dong Oh Shin, Daejeon (KR); Bu Won Son, Daejeon (KR)

(73) Assignee: LG CHEM, LTD., Seoul (KR)

( * ) Notice: Subject to any disclaimer, the term of this patent is extended or adjusted under 35 U.S.C. 154(b) by 102 days.

(21) Appl. No.: 15/533,540

(22) PCT Filed: Sep. 13, 2016

(86) PCT No.: PCT/KR2016/010329
§ 371 (c)(1),
(2) Date: Jun. 6, 2017

(87) PCT Pub. No.: WO2017/048047
PCT Pub. Date: Mar. 23, 2017

(65) Prior Publication Data
US 2017/0338494 A1   Nov. 23, 2017

(30) Foreign Application Priority Data
Sep. 18, 2015   (KR) .......... 10-2015-0132385

(51) Int. Cl.
*H01M 4/86*   (2006.01)
*H01M 4/88*   (2006.01)
(Continued)

(52) U.S. Cl.
CPC ....... *H01M 4/8605* (2013.01); *H01M 4/8875* (2013.01); *H01M 4/8885* (2013.01); *H01M 4/905* (2013.01); *H01M 4/9058* (2013.01); *H01M 8/124* (2013.01); *H01M 8/1246* (2013.01); *H01M 2008/1293* (2013.01); *Y02P 70/56* (2015.11)

(58) Field of Classification Search
None
See application file for complete search history.

(56) References Cited

U.S. PATENT DOCUMENTS

2002/0142210 A1*  10/2002  Kaiser ................. H01M 4/8621
                                                                       429/510
2009/0068373 A1    3/2009  Lee et al.
(Continued)

FOREIGN PATENT DOCUMENTS

CN   104302390 A     1/2015
EP   1 551 071 A1    7/2005
(Continued)

OTHER PUBLICATIONS

International Search Report for PCT/KR2016/010329 (PCT/ISA/210) dated Nov. 23, 2016.
(Continued)

*Primary Examiner* — Christopher P Domone
(74) *Attorney, Agent, or Firm* — Birch, Stewart, Kolasch & Birch, LLP

(57) ABSTRACT

The present specification relates to an electrode slurry of a solid oxide fuel cell, a green sheet for an electrode of a solid oxide fuel cell, an electrode of a solid oxide fuel cell, a solid oxide fuel cell, and a method for manufacturing an electrode of a solid oxide fuel cell.

17 Claims, 1 Drawing Sheet

(51) Int. Cl.
*H01M 8/1246* (2016.01)
*H01M 8/124* (2016.01)
*H01M 4/90* (2006.01)

(56) References Cited

U.S. PATENT DOCUMENTS

| | | |
|---|---|---|
| 2011/0244365 A1 | 10/2011 | Ryu et al. |
| 2012/0003565 A1 | 1/2012 | Son et al. |
| 2013/0216700 A1* | 8/2013 | Morioka ............ H01M 4/8605 427/115 |
| 2013/0295489 A1 | 11/2013 | Kim et al. |
| 2014/0113213 A1 | 4/2014 | Wei et al. |
| 2014/0170523 A1 | 6/2014 | Koo et al. |
| 2015/0017084 A1 | 1/2015 | Zhang et al. |

FOREIGN PATENT DOCUMENTS

| | | |
|---|---|---|
| JP | 9-227212 A | 9/1997 |
| JP | 9-302438 A | 11/1997 |
| JP | 2002-313350 A | 10/2002 |
| JP | 2008-293828 A | 12/2008 |
| JP | 2012-201516 A | 10/2012 |
| JP | 2012-209266 A | 10/2012 |
| JP | 2014-67488 A | 4/2014 |
| KR | 10-2003-0045324 A | 6/2003 |
| KR | 10-2010-0104761 A | 9/2010 |
| KR | 10-2012-0086113 A | 8/2012 |
| KR | 10-2013-0025175 A | 3/2013 |
| KR | 10-2013-0123189 A | 11/2013 |
| KR | 10-2015-0052662 A | 5/2015 |

OTHER PUBLICATIONS

Japanese Office Action and English translation for Japanese Application No. 2017-527840, dated Jul. 24, 2018.
Sanson at al., "Influence of pore formers on slurry composition and microstructure of tape cast supporting anodes for SOFCs", Journal of the European Ceramic Society, vol. 28, No. 6, Feb. 7, 2007, pp. 1221-1226.
Extended European Search Report for European Patent Application No. 16846868.4, dated Feb. 21, 2019.

* cited by examiner

[Figure 1]
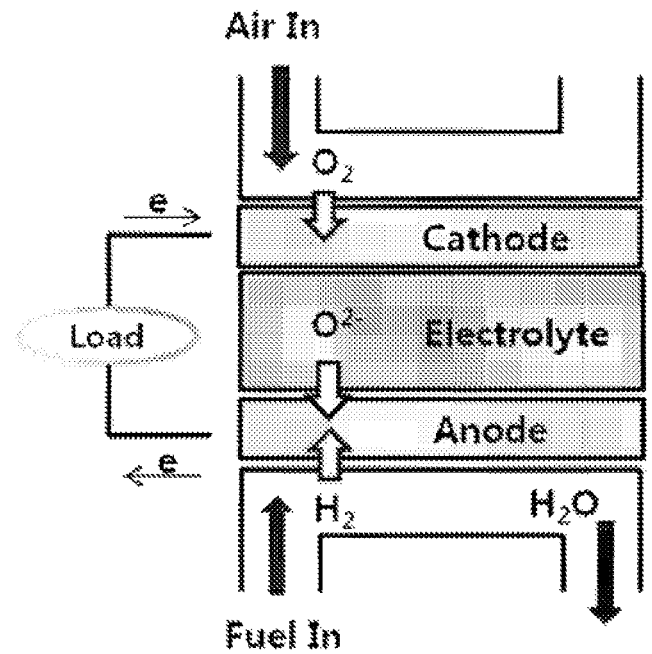
[Figure 2]
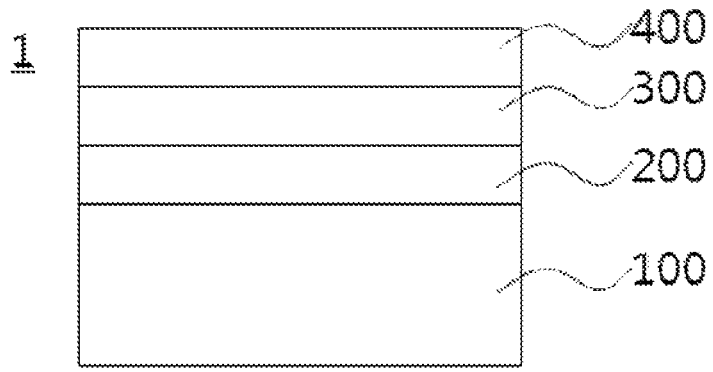

ELECTRODE SLURRY OF SOLID OXIDE FUEL CELL, GREEN SHEET FOR ELECTRODE OF SOLID OXIDE FUEL CELL, ELECTRODE OF SOLID OXIDE FUEL CELL, AND METHOD FOR MANUFACTURING SOLID OXIDE FUEL CELL AND ELECTRODE OF SOLID OXIDE FUEL CELL

TECHNICAL FIELD

The present invention claims priority to and the benefit of Korean Patent Application No. 10-2015-0132385 filed in the Korean Intellectual Property Office on Sep. 18, 2015, the entire contents of which are incorporated herein by reference.

The present specification relates to an electrode slurry of a solid oxide fuel cell, a green sheet for an electrode of a solid oxide fuel cell, an electrode of a solid oxide fuel cell, a solid oxide fuel cell, and a method for manufacturing an electrode of a solid oxide fuel cell.

BACKGROUND ART

Recently, with the expected exhaustion of the existing energy resources such as petroleum or coal, there is a growing interest in energy which may substitute for the existing energy resources. As one of these alternative energies, a fuel cell is receiving particular attention due to the advantages in that the fuel cell is highly efficient and does not discharge pollutants such as NOx and Sox, and the fuel used is abundant.

A fuel cell is a power generation system which converts chemical reaction energy of a fuel and an oxidizing agent into electric energy, and representatively, hydrogen and hydrocarbons such as methanol or butane are used as the fuel, and oxygen is used as the oxidizing agent.

Examples of the fuel cell include a polymer electrolyte membrane fuel cell (PEMFC), a direct-methanol fuel cell (DMFC), a phosphoric acid fuel cell (PAFC), an alkaline fuel cell (AFC), a molten carbonate fuel cell (MCFC), a solid oxide fuel cell (SOFC), and the like.

FIG. 1 schematically illustrates the electricity generation principle of a solid oxide fuel cell, and the solid oxide fuel cell is composed of an electrolyte layer (electrolyte) and a fuel electrode (anode) and an air electrode (cathode) formed on both surfaces of the electrolyte layer. Referring to FIG. 1 illustrating the electricity generation principle of the solid oxide fuel cell, oxygen ions are produced while the air is electrochemically reduced in the air electrode, and the produced oxygen ions are transferred to the fuel electrode through the electrolyte layer. Fuel such as oxygen, methanol, and butane is injected into the fuel electrode, and the fuel is bonded to oxygen ions to give out electrons while being electrochemically oxidized, thereby producing water. Electrons move to an external circuit by the reaction.

DETAILED DESCRIPTION OF THE INVENTION

Technical Problem

The present specification has been made in an effort to provide an electrode slurry of a solid oxide fuel cell, a green sheet for an electrode of a solid oxide fuel cell, an electrode of a solid oxide fuel cell, a solid oxide fuel cell, and a method for manufacturing an electrode of a solid oxide fuel cell.

Technical Solution

The present specification provides an electrode slurry of a solid oxide fuel cell including oxygen ion conductive inorganic particles, a pore forming agent, a controlled flocculating agent, and a solvent.

Further, the present specification provides a green sheet for an electrode of a solid oxide fuel cell manufactured by using the electrode slurry.

In addition, the present specification provides an electrode of a solid oxide fuel cell manufactured by using the electrode slurry.

Furthermore, the present specification provides a solid oxide fuel cell sequentially including a fuel electrode, an electrolyte layer, and an air electrode, in which at least one of the fuel electrode and the air electrode includes the electrode.

Further, the present specification provides a solid oxide fuel cell sequentially including a fuel electrode, an electrolyte layer, and an air electrode, in which the fuel electrode includes the electrode.

In addition, the present specification provides a method for manufacturing an electrode of a solid oxide fuel cell, the method including: forming a green sheet for an electrode of a solid oxide fuel cell by using an electrode slurry of a solid oxide fuel cell including oxygen ion conductive inorganic particles, a pore forming agent, a controlled flocculating agent, and a solvent; and manufacturing an electrode by sintering the green sheet for the electrode of the solid oxide fuel cell.

Advantageous Effects

The electrode of the solid oxide fuel cell, which is manufactured according to the present specification, has an advantage in that the triple phase boundary (TPB) is increased.

A battery including the electrode of the solid oxide fuel cell, which is manufactured according to the present specification, has an effect in that the performance of a cell is improved.

The electrode slurry of the present specification has an advantage in that the dispersion stability of the inorganic particles is high.

BRIEF DESCRIPTION OF DRAWINGS

FIG. 1 is a schematic view illustrating the electricity generation principle of a solid oxide fuel cell (SOFC).

FIG. 2 is a schematic view of a fuel electrode-supported solid oxide fuel cell.

EXPLANATION OF REFERENCE NUMERALS AND SYMBOLS

1: Solid oxide fuel cell
100: Fuel electrode support
200: Fuel electrode functional layer
300: Electrolyte layer
400: Air electrode

BEST MODE

Hereinafter, the present specification will be described in detail.

The present specification provides an electrode slurry of a solid oxide fuel cell including oxygen ion conductive inorganic particles, a pore forming agent, a controlled flocculating agent, and a solvent.

The oxygen ion conductive inorganic particles may have an oxygen ion conductivity of 0.01 S/cm or more at 600° C. The higher the oxygen ion conductivity of the oxygen ion conductive inorganic particles is, the better the first inorganic particles are, so that the upper limit of the oxygen ion conductivity is not particularly limited.

The oxygen ion conductive inorganic particles are not particularly limited, but may include at least one of yttria-stabilized zirconia (YSZ: $(Y_2O_3)_x(ZrO_2)_{1-x}$, x=0.05 to 0.15), scandia-stabilized zirconia (ScSZ: $(Sc_2O_3)x(ZrO_2)_{1-x}$, x=0.05 to 0.15), samarium doped ceria (SDC: $(Sm_2O_3)x(CeO_2)1-x$, x=0.02 to 0.4), gadolinium doped ceria (GDC: $(Gd_2O_3)x(CeO_2)1-x$, x=0.02 to 0.4), lanthanum strontium manganese oxide (LSM), lanthanum strontium cobalt ferrite (LSCF), lanthanum strontium nickel ferrite (LSNF), lanthanum calcium nickel ferrite (LCNF), lanthanum strontium copper oxide (LSC), gadolinium strontium cobalt oxide (GSC), lanthanum strontium ferrite (LSF), samarium strontium cobalt oxide (SSC), barium Strontium cobalt ferrite (BSCF), and lanthanum strontium gallium magnesium oxide (LSGM).

Based on the total weight of the electrode slurry, the content of the oxygen ion conductive inorganic particles may be 10 wt % or more and 70 wt % or less.

The pore forming agent is not particularly limited as long as the pore forming agent forms pores in a sintered electrode, but may include at least one of, for example, polyvinylpyrrolidone (PVP), polyethylene glycol, polyvinyl alcohol, diethylglycol, polymethylmethacrylate (PMMA), and triethylglycol.

The pore forming agent may be removed at a sintered temperature so as to form pores in a sintered electrode, and may have a target pore size. The pore forming agent may have a size of 0.01 μm or more and 500 μm or less.

Based on the total weight of the electrode slurry, the content of the pore forming agent may be 1 wt % or more and 20 wt % or less. In this case, there is an advantage in that effective pores may be maximized.

The controlled flocculating agent means a cross-linkable flocculating agent which forms cross-linkages among oxygen ion conductive inorganic particles, and the controlled flocculating agent is flocculated as a soft precipitate which is adjusted via a bridged bond with inorganic particles. The flocculated soft precipitate is bonded via a chemical hydrogen bond, a coordination bond, or a van der Waals bond.

The controlled flocculating agent forms bridges among inorganic particles, and forms an airy 3D structure throughout the solvent. Inorganic particles such as oxygen ion conductive inorganic particles and metal or metal oxide particles are flocculated as a reversible or weak aggregate by adding the controlled flocculating agent to an electrode slurry. The controlled flocculating agent may be re-dispersed, if necessary, and flocculates only inorganic particles to prevent the size of the inorganic particles themselves from being increased, and may evenly distribute the inorganic particles in the electrode slurry by forming a 3D structure throughout the solvent. Further, since the controlled flocculating agent forms an airy 3D structure while forming bridges among inorganic particles, the controlled flocculating agent occupies a larger space than the volume of the controlled flocculating agent itself, and as a result, when the controlled flocculating agent present among inorganic particles is removed by sintering the electrode slurry, large-sized pores resulting from the controlled flocculating agent may be formed in the electrode.

The controlled flocculating agent may be an organic flocculating agent, and for example, the controlled flocculating agent may include at least one of a polycarboxylic acid salt, a polyamine salt, an alkyloammonium salt of an unsaturated fatty acid, and a low-molecular weight unsaturated polycarboxylic acid polyester.

Based on the total weight of the oxygen ion conductive inorganic particles, a metal or a metal oxide to be described below, and the pore forming agent, the content of the controlled flocculating agent may be 1 wt % or more and 20 wt % or less. In other words, based on the total weight of the oxygen ion conductive inorganic particles, a metal or a metal oxide to be described below, and the pore forming agent, the content of the controlled flocculating agent may be 1 wt % or more and 20 wt % or less. In this case, there is an advantage in that it is possible to obtain high electric conductivity and effective porosity.

Based on the total weight of the electrode slurry, the content of the controlled flocculating agent may be 1 wt % or more and 20 wt % or less.

When a controlled flocculating agent is added instead of an existing dispersing agent, there is an advantage in that the effective porosity is increased because the controlled flocculating agent helps pores formed by the pore forming agent to be capable of being stably formed during the sintering while uniformly dispersing the solid content in the slurry.

This is because there is a limitation in adjusting the size of the pore forming agent in order to obtain the effective porosity, and when the size of the pore forming agent is too large, the ratio of the triple phase boundary is relatively decreased.

However, according to the present specification, the added controlled flocculating agent helps a larger number of pores than the number of pores, which may be formed by only a pore forming agent, to be capable of being formed while the added controlled flocculating agent serves as a dispersing agent, and as a result, there is an advantage in that the ratio of forming pores in the electrode to the content of the pore forming agent is increased.

The solvent is not largely limited as long as the solvent is a material which disperses inorganic particles and is easily removed from a membrane or a green sheet, and a typical material known in the art may be used. For example, the solvent may include at least one selected from water, isopropanol, toluene, ethanol, n-propanol, n-butyl acetate, ethylene glycol, butyl carbitol (BC), and butyl carbitol acetate (BCA).

Based on the total weight of the electrode slurry, the content of the solvent may be 5 wt % or more and 60 wt % or less. In this case, there is an advantage in that it is possible to maintain a viscosity at which the electrode slurry can be applied.

The electrode slurry may further include metal or metal oxide particles including at least one of Ni, NiO, Ru, Co, and Pt. Preferably, the electrode slurry may further include Ni or NiO.

Based on the total weight of the electrode slurry, the content of the metal or metal oxide particles may be 10 wt % or more and 80 wt % or less.

The electrode slurry may further include a plasticizer, a binder resin, and an antifoaming agent.

The plasticizer, the binder resin, and the antifoaming agent are not particularly limited, and typical materials known in the art may be used.

The plasticizer may be at least one of di-butyl-phthalate (DBP), di-2-ethylhexyl phthalate (DOP), di-isononyl phthalate (DINP), di-isodecyl phthalate (DIDP), and butyl benzyl phthalate (BBP).

Based on the total weight of the electrode slurry, the content of the binder resin may be 1 wt % or more and 20 wt % or less.

Based on the total weight of the electrode slurry, the content of the antifoaming agent may be 0.1 wt % or more and 5 wt % or less.

Based on the total weight of the electrode slurry, the content of the plasticizer may be 0.5 wt % or more and 2 wt % or less.

The present specification provides a green sheet for an electrode of a solid oxide fuel cell manufactured by using the electrode slurry.

In the present specification, the green sheet means not a complete final product, but a membrane in the form of a film which can be processed in the next step. In other words, the green sheet is coated with a coating composition including inorganic particles and a solvent and dried in the form of a sheet, and the green sheet refers to a half-dried state sheet which includes a small amount of a solvent and may maintain the sheet form.

A method for manufacturing the green sheet is not particularly limited, but the green sheet may be manufactured by a tape casting method.

The thickness of the green sheet is determined depending on the thickness of an electrode to be manufactured. Since the other compositions except for the inorganic particles in the electrode are removed by sintering the green sheet, it is preferred that the thickness of the green sheet is larger than a thickness of a target electrode.

The thickness of the green sheet is not particularly limited, but when the target electrode is a fuel electrode support having a large thickness, the green sheet may have a thickness of 350 μm or more and 1,000 μm or less, and when the target electrode is not a support but a fuel electrode or a fuel electrode functional layer, the green sheet may have a thickness of 10 μm or more and 100 μm or less.

The present specification provides an electrode of a solid oxide fuel cell manufactured by using the electrode slurry.

The electrode may have a porosity of 20% or more and 50% or less. In this case, there is an effect in that the performance of a battery cell is improved because the triple phase boundary (TPB) is increased.

The electrode may have a pore size of 0.1 μm or more and 500 μm or less.

The pore formation rate of a pore forming agent according to the following Equation 1 may be 0.7 or more.

$$\text{Pore formation rate of pore forming agent} = \frac{B}{A} \quad \text{[Equation 1]}$$

In Equation 1, A is a content (vol %) of the pore forming agent based on a sum of volumes of the inorganic material and the pore forming agent, and B is a porosity (%) of an electrode.

In this case, when a metal or a metal oxide is added to a slurry, the inorganic material may be oxygen ion conductive inorganic particles and a metal or a metal oxide, and when a metal or a metal oxide is not added to a slurry, the inorganic material may be oxygen ion conductive inorganic particles.

The present specification provides a solid oxide fuel cell sequentially including a fuel electrode, an electrolyte layer, and an air electrode, in which at least one of the fuel electrode and the air electrode includes the electrode.

The present specification provides a solid oxide fuel cell sequentially including a fuel electrode, an electrolyte layer, and an air electrode, in which the fuel electrode includes the electrode.

The electrode may be a fuel electrode support having a thickness of 1 μm or more. Specifically, the fuel electrode support may have a thickness of 300 μm or more and 900 μm or less.

The fuel electrode may further include a fuel electrode functional layer disposed between the fuel electrode support and the electrolyte layer.

A material for the fuel electrode functional layer, the electrolyte membrane, and the air electrode is not particularly limited, and may be adopted from those generally used in the art.

The fuel electrode functional layer may have a thickness of 10 μm or more and 90 μm or less.

The electrolyte layer may have a thickness of 1 μm or more and 100 μm or less.

The air electrode may have a thickness of 1 μm or more and 1,000 μm or less.

The present specification provides a method for manufacturing an electrode of a solid oxide fuel cell, the method including: forming a green sheet for an electrode of a solid oxide fuel cell by using an electrode slurry of a solid oxide fuel cell including oxygen ion conductive inorganic particles, a controlled flocculating agent, and a solvent; and manufacturing an electrode by sintering the green sheet for the electrode of the solid oxide fuel cell.

In the method for manufacturing an electrode of a solid oxide fuel cell, it is possible to cite the description on the electrode slurry of the solid oxide fuel cell, the green sheet for the electrode of the solid oxide fuel cell, the electrode of the solid oxide fuel cell, and the solid oxide fuel cell.

The method for forming the green sheet for the electrode of the solid oxide fuel cell is not particularly limited, but the green sheet for the electrode of the solid oxide fuel cell may be formed by a tape casting method.

The sintering of the green sheet for the electrode of the solid oxide fuel cell may be forming pores in a solidified body solidified with the oxygen ion conductive inorganic particles while the oxygen ion conductive inorganic particles are solidified and the controlled flocculating agent is removed.

The sintering of the green sheet for the electrode of the solid oxide fuel cell may be together sintering (simultaneously sintering) a plurality of green sheets laminated by laminating additional green sheets.

An electrode manufactured by the method for manufacturing the electrode of the solid oxide fuel cell may be at least one of a fuel electrode, a fuel electrode support, and an air electrode of a solid oxide fuel cell, and specifically, the electrode manufactured by the method for manufacturing the electrode of the solid oxide fuel cell may be a fuel electrode support of a solid oxide fuel cell.

MODE FOR INVENTION

Hereinafter, the present specification will be described in more detail through Examples. However, the following

EXAMPLES are provided only for exemplifying the present specification, but are not intended to limit the present specification.

EXAMPLES

Example 1

1. Step of Manufacturing Slurry

After 12.5 g of a GDC powder (Rhodia Inc., UHSA grade, primary particle size: ~30 nm) as inorganic particles, 22.0 g of a nickelous oxide powder (J. T. Baker, primary particle: ~about 200 nm), 4 g of PMMA beads (Sekisui Co., Ltd., primary particle size: 1 μm, Grade: SSX-101), and 5.5 g of GDC Powder and an aqueous controlled flocculating agent solution (Anti Terra-250, solid contents: 70%) were mixed with 20.0 g of D.I. water, 25 g of balls (3 mm, $ZrO_2$) were put into a container, and then the resulting mixture was dispersed therein for 48 hours. Additionally, 20.0 g of an aqueous binder solution (Polymer Innovation Co., Ltd., Grade: WB40B-53, solid contents: 25%) and 2.0 g of an antifoaming agent (Polymer Innovation Co., Ltd., Grade: DF002) were added to the dispersion, and then subjected to a mixing process for 72 hours to complete a slurry.

Based on the total weight of the slurry, the contents of the GDC powder, the nickelous oxide powder, the PMMA beads, the Anti Terra-250, the binder resin, the antifoaming agent, and the solvent were 14.5 wt %, 25.6 wt %, 4.7 wt %, 4.5 wt %, 5.8 wt %, 2.3 wt, and 42.6 wt %, respectively. In this case, based on the sum of weights of the GDC powder, the nickelous oxide powder, and the PMMA beads, the content of the Anti Terra-250 was 11.7 wt %.

2. Manufacture of Tape

The manufactured slurry was coated to have a thickness of 600 μm on a polyethylene terephthalate (PET) film by using a film casting apparatus, and then the solvent was evaporated at a temperature of 60° C., thereby manufacturing a green sheet in a dried state.

3. Sintering Step

The green sheet was sintered at 1,500° C., thereby manufacturing a sintered body having a thickness of about 450 μm.

Comparative Example 1

A sintered body having a thickness of about 400 μm was manufactured by carrying out the manufacture in the same manner as in Example 1, except that 5.5 g of Byk 187 (solid contents: 70%) was used instead of Anti-Terra 250 in Example 1.

Comparative Example 2

A sintered body having a thickness of about 390 μm was manufactured by carrying out the manufacture in the same manner as in Example 1 except that 10.0 g of Byk 190 (solid contents: 40%) and 15.5 g of D.I. water were used instead of Anti-Terra 250 in Example 1.

Experimental Example 1

In order to measure the porosity of the sintered body, a measurement was made by using the Archimedes density measuring method, and specifically, the sintered bodies fired in the Example and Comparative Examples 1 and 2 were each put into a measuring container containing 300 ml of distilled water, the measuring container was heated for 2 hours, and then the densities were measured by using the Archimedes density measuring method. The measurement results are shown in the following Table 1.

Experimental Example 2

Shrinkage Experiment

The changes in shrinkage caused by firing in the Example and Comparative Examples 1 and 2 were quantified. In this case, based on the thickness and size (2.5 cm×2.5 cm) before the firing, the changes in thickness and size (breadth×length) after the firing were calculated as a percentage, and the shrinkages in thickness and size were each shown in Table 1.

According to the results of the following Table 1, it can be seen that the Example has a smaller shrinkage than those in the Comparative Examples, and it can be seen that 3D structured cross-linkages are made by a controlled flocculating agent, so that the shrinkage is small during the firing, and as a result, the dimensional stability is good.

TABLE 1

|  | Example 1 | Comparative Example 1 | Comparative Example 2 |
|---|---|---|---|
| Comparative factor | AntiTerra 250 | Byk 187 | Byk 190 |
| Content (A) of pore forming agent | 35 vol % | 35 vol % | 35 vol % |
| Porosity (B) | 38 vol % | 22 vol % | 20 vol % |
| Pore formation rate (Equation 1) | 1.08 | 0.63 | 0.57 |
| Thickness shrinkage rate | 35% | 43% | 44% |
| Size shrinkage rate | 17% | 26% | 26% |

$$\text{Pore formation rate of pore forming agent} = \frac{B}{A} \quad [\text{Equation 1}]$$

In Equation 1, A is a content (vol %) of the pore forming agent based on a sum of volumes of the inorganic material and the pore forming agent, and B is a porosity (vol %) of an electrode.

The invention claimed is:

1. An electrode slurry of a solid oxide fuel cell, comprising:
    oxygen ion conductive inorganic particles;
    a pore forming agent;
    a controlled flocculating agent,
    wherein the controlled flocculating agent comprises at least one of an alkylol ammonium salt of a polycarboxylic acid salt, a polyamine salt, an alkylol ammonium salt of an unsaturated fatty acid, and a low-molecular weight unsaturated polycarboxylic acid polyester; and
    a solvent.

2. The electrode slurry of claim 1, wherein the electrode slurry further comprises a metal or a metal oxide comprising at least one of Ni, NiO, Ru, Co, and Pt.

3. The electrode slurry of claim 1, wherein the controlled flocculating agent is a cross-linkable flocculating agent which forms cross-linkages among the oxygen ion conductive inorganic particles.

4. The electrode slurry of claim 1, wherein the controlled flocculating agent is an organic flocculating agent.

5. The electrode slurry of claim 2, wherein based on a total weight of the oxygen ion conductive inorganic particles, the metal or the metal oxide, and the pore forming agent, a content of the controlled flocculating agent is 1 wt % or more and 20 wt % or less.

6. A green sheet for an electrode of a solid oxide fuel cell, which is manufactured by using the electrode slurry of claim 1.

7. An electrode of a solid oxide fuel cell, which is manufactured by using the electrode slurry of claim 1.

8. The electrode of claim 7, wherein the electrode has a porosity of 20% or more and 50% or less.

9. The electrode of claim 7, wherein a pore formation rate of a pore forming agent according to the following Equation 1 is 0.7 or more:

$$\text{Pore formation rate of pore forming agent} = \frac{B}{A} \quad \text{[Equation 1]}$$

in Equation 1, A is a content (vol %) of the pore forming agent based on a sum of volumes of the inorganic material and the pore forming agent, and B is a porosity (%) of an electrode.

10. The electrode of claim 7, wherein the electrode has a pore size of 0.1 μm or more and 500 μm or less.

11. A solid oxide fuel cell sequentially comprising:
a fuel electrode;
an electrolyte layer; and
an air electrode,
wherein at least one of the fuel electrode and the air electrode comprises the electrode according to claim 7.

12. A solid oxide fuel cell sequentially comprising:
a fuel electrode;
an electrolyte layer; and
an air electrode,
wherein the fuel electrode comprises the electrode according to claim 7.

13. The solid oxide fuel cell of claim 12, wherein the electrode is a fuel electrode support having a thickness of 1 μm or more.

14. The solid oxide fuel cell of claim 13, wherein the fuel electrode further comprises a fuel electrode functional layer disposed between the fuel electrode support and the electrolyte layer.

15. A method for manufacturing an electrode of a solid oxide fuel cell, the method comprising:
forming a green sheet for an electrode of a solid oxide fuel cell by using the electrode slurry according to claim 1; and
manufacturing an electrode by sintering the green sheet for the electrode of the solid oxide fuel cell.

16. The method of claim 15, wherein the sintering of the green sheet for the electrode of the solid oxide fuel cell is forming pores in a solidified body solidified with the oxygen ion conductive inorganic particles while the oxygen ion conductive inorganic particles are solidified and the controlled flocculating agent is removed.

17. The method of claim 15, wherein the electrode is a fuel electrode support of a solid oxide fuel cell.

* * * * *